(12) United States Patent
Yoeda

(10) Patent No.: US 10,731,548 B2
(45) Date of Patent: Aug. 4, 2020

(54) MECHANICAL SUPERCHARGING SYSTEM

(71) Applicant: TOYOTA JIDOSHA KABUSHIKI KAISHA, Toyota-shi, Aichi-ken (JP)

(72) Inventor: Keiji Yoeda, Numazu (JP)

(73) Assignee: TOYOTA JIDOSHA KABUSHIKI KAISHA, Toyota-shi (JP)

( * ) Notice: Subject to any disclaimer, the term of this patent is extended or adjusted under 35 U.S.C. 154(b) by 133 days.

(21) Appl. No.: 15/945,467

(22) Filed: Apr. 4, 2018

(65) Prior Publication Data
US 2018/0313259 A1 Nov. 1, 2018

(30) Foreign Application Priority Data
Apr. 27, 2017 (JP) .................................. 2017-088457

(51) Int. Cl.
*F02B 39/04* (2006.01)
*F16H 61/02* (2006.01)
*F02B 33/40* (2006.01)
*F02D 41/00* (2006.01)
*F02D 41/02* (2006.01)
(Continued)

(52) U.S. Cl.
CPC .............. *F02B 39/04* (2013.01); *F02B 33/40* (2013.01); *F02D 41/0007* (2013.01); *F02D 41/023* (2013.01); *F16H 61/0204* (2013.01); *B60W 30/19* (2013.01); *B60W 2510/0638* (2013.01); *F02D 2200/0406* (2013.01); *F02D 2200/1012* (2013.01); *F16H 59/36* (2013.01); *F16H 59/70* (2013.01); *F16H 2059/366* (2013.01); *F16H 2059/6807* (2013.01); *Y02T 10/144* (2013.01); *Y10T 477/50* (2015.01); *Y10T 477/6237* (2015.01); *Y10T 477/675* (2015.01)

(58) Field of Classification Search
CPC .......... B60W 30/19; B60W 2510/0638; Y10T 477/50; Y10T 477/6237; Y10T 477/675; F16H 61/0204; F16H 2059/366; F16H 2059/6807; F16H 59/36; F16H 59/70; F02B 39/04; F02B 33/40; F02D 41/0007; F02D 2200/0406
See application file for complete search history.

(56) References Cited

U.S. PATENT DOCUMENTS

| 5,890,468 A * | 4/1999 | Ozawa ................. F02B 37/005 123/561 |
| 2003/0106540 A1 | 6/2003 | Berglund |
| 2007/0204602 A1 | 9/2007 | Kogo |

FOREIGN PATENT DOCUMENTS

| EP | 1287245 B1 | 8/2005 |
| EP | 1801370 A1 | 6/2007 |

(Continued)

Primary Examiner — Roger L Pang
(74) Attorney, Agent, or Firm — Hunton Andrews Kurth LLP

(57) ABSTRACT

A mechanical supercharging system includes a stepped transmission that connects a crankshaft of an internal combustion engine with driving wheels, a centrifugal supercharger including a rotary drive shaft connected to the crankshaft, a variable speed ratio device that changes a speed ratio of the rotary drive shaft to the crankshaft, the variable speed ratio device being provided between the crankshaft and the rotary drive shaft; and a control device configured to control the speed ratio. The control device increases the speed ratio during the upshift operation more than the speed ratio before start of the upshift operation.

5 Claims, 7 Drawing Sheets

(51) Int. Cl.
 *F16H 59/70* (2006.01)
 *F16H 59/36* (2006.01)
 *F16H 59/68* (2006.01)
 *B60W 30/19* (2012.01)

(56) References Cited

FOREIGN PATENT DOCUMENTS

| | | |
|---|---|---|
| EP | 3043039 A1 | 7/2016 |
| JP | S61-175235 A | 8/1986 |
| JP | H03-141826 A | 6/1991 |
| JP | H10-331650 A | 12/1998 |
| JP | 2010-001896 A | 1/2010 |
| WO | 0192699 A1 | 12/2001 |

* cited by examiner

MECHANICAL SUPERCHARGING SYSTEM

INCORPORATION BY REFERENCE

The disclosure of Japanese Patent Application No. 2017-088457 filed on Apr. 27, 2017 including the specification, drawings and abstract is incorporated herein by reference in its entirety.

BACKGROUND

1. Technical Field

The present disclosure relates to mechanical supercharging systems, and more particularly relates to a system including a mechanical supercharger that compresses intake air of an internal combustion engine.

2. Description of Related Art

Japanese Patent Application Publication No. 3-141826 discloses a control device of an internal combustion engine including a mechanical supercharger. The mechanical supercharger includes a rotary drive shaft. The rotary drive shaft is connected to a crankshaft of the internal combustion engine through a continuously variable transmission. The control device is configured to control a gear ratio of the transmission based on deviation between a target supercharging pressure and an actual supercharging pressure. For example, when the actual supercharging pressure is lower than the target supercharging pressure, the control device changes a target gear ratio of the continuously variable transmission to be a higher value. When the target gear ratio is changed to be a higher value, the speed of the mechanical supercharger increases. When the speed increases, the actual supercharging pressure increases. Thus, the actual supercharging pressure can be made to follow the target supercharging pressure.

SUMMARY

General vehicle drive systems include a continuously variable or a stepped transmission that provides connection between a crankshaft and driving wheels (hereinafter also referred to as "tires"). The continuously variable transmission does not include any gear stage, so that a speed ratio between the crankshaft and the driving wheels is continuously and automatically changed. The stepped transmission performs gradual switching of the gear stage. The stepped transmission includes a stepped automatic transmission as well as a stepped manual transmission.

In a vehicle drive system including the stepped transmission for tires, when the gear stage of the stepped transmission is shifted up, engine speed decreases. This phenomenon also occurs in a system formed by combining the internal combustion engine including the mechanical supercharger with the stepped transmission for tires. In such a system, when the engine speed decreases with the upshift operation of the gear stage, the speed of the mechanical supercharger declines. However, the mechanical supercharger is a positive displacement supercharger. The positive displacement supercharger pumps out a constant volume of air regardless of the pressure on an air discharge side. Accordingly, even when the speed of the positive displacement supercharger declines with the upshift operation of the gear stage, an influence exerted upon the actual supercharging pressure is small.

The mechanical supercharger includes a positive displacement supercharger and a centrifugal supercharger. The centrifugal supercharger pumps out the air, taken from a central suction port, toward a peripheral protruding port with centrifugal force. The air in the centrifugal supercharger is subjected to outward centrifugal force and inward pressure (i.e., pressure on the air discharge side). When the outward centrifugal force is relatively large, the air is pumped out. When the inward pressure is relatively large, the air is pumped back. That is, the speed of the centrifugal supercharger exerts a large influence on the actual supercharging pressure.

Therefore, in the system formed by combining the internal combustion engine including the centrifugal supercharger with the stepped transmission for tires, when the engine speed decreases with upshift operation of the gear stage, and thereby the speed of the centrifugal supercharger declines, the actual supercharging pressure declines. As the actual supercharging pressure declines, torque generated in the internal combustion engine reduces. Therefore, a difference in vehicle acceleration is generated during upshift operation, which may give discomfort to a driver.

The present disclosure provides a mechanical supercharging system formed by combining an internal combustion engine including a centrifugal supercharger with a stepped transmission for tires, the system being capable of avoiding failures generated when engine speed decreases with upshift operation of a gear stage.

A mechanical supercharging system according to an aspect of the present disclosure includes a stepped transmission, a centrifugal supercharger, a variable speed ratio device, and a control device. The stepped transmission connects a crankshaft of an internal combustion engine with driving wheels, and performs at least upshift operation of a gear stage. The centrifugal supercharger rotates in conjunction with the crankshaft to compress intake air of the internal combustion engine, the centrifugal supercharger including a rotary drive shaft connected to the crankshaft. The variable speed ratio device that changes a speed ratio of the rotary drive shaft to the crankshaft, the variable speed ratio device being provided between the crankshaft and the rotary drive shaft. The control device is configured to control the speed ratio. The control device increases the speed ratio during the upshift operation more than the speed ratio before start of the upshift operation.

In the aspect, the control device may increase the speed ratio during the upshift operation in accordance with a decrease rate of speed of the crankshaft during the upshift operation.

In the aspect, the control device may increase the speed ratio during the upshift operation such that the speed of the rotary drive shaft rises to a specified value immediately after the start of the upshift operation, the specified value being higher than a value at the end of the upshift operation, and once the speed of the rotary drive shaft reaches the specified value, the control device may reduce the speed ratio during the upshift operation such that the speed of the rotary drive shaft decreases to the value at the end of the upshift operation.

In the aspect, the control device may increase the speed ratio during the upshift operation such that the speed of the rotary drive shaft rises to a specified value immediately after the start of the upshift operation, the specified value being higher than a value at the end of the upshift operation, and once the speed of the rotary drive shaft reaches the specified value, and the supercharging pressure reaches a target supercharging pressure, the control device may reduce the speed ratio during the upshift operation such that the speed of the rotary drive shaft decreases to the value at the end of the upshift operation.

In the configuration, the specified value may be an upper limit of the speed of the rotary drive shaft.

The present aspect can suppress decrease in speed of the centrifugal supercharger even when the engine speed decreases with upshift operation. Therefore, it is possible to suppress reduction in torque generated in the internal combustion engine.

BRIEF DESCRIPTION OF THE DRAWINGS

Features, advantages, and technical and industrial significance of exemplary embodiments of the disclosure will be described below with reference to the accompanying drawings, in which like numerals denote like elements, and wherein.

DETAILED DESCRIPTION OF EMBODIMENTS

Hereinafter, embodiments of the present disclosure will be described based on the drawings. Note that elements identical in each of the drawings are designated by identical reference signs to omit redundant description. The following embodiments are not intended to limit the present disclosure.

First Embodiment

Figure 1:
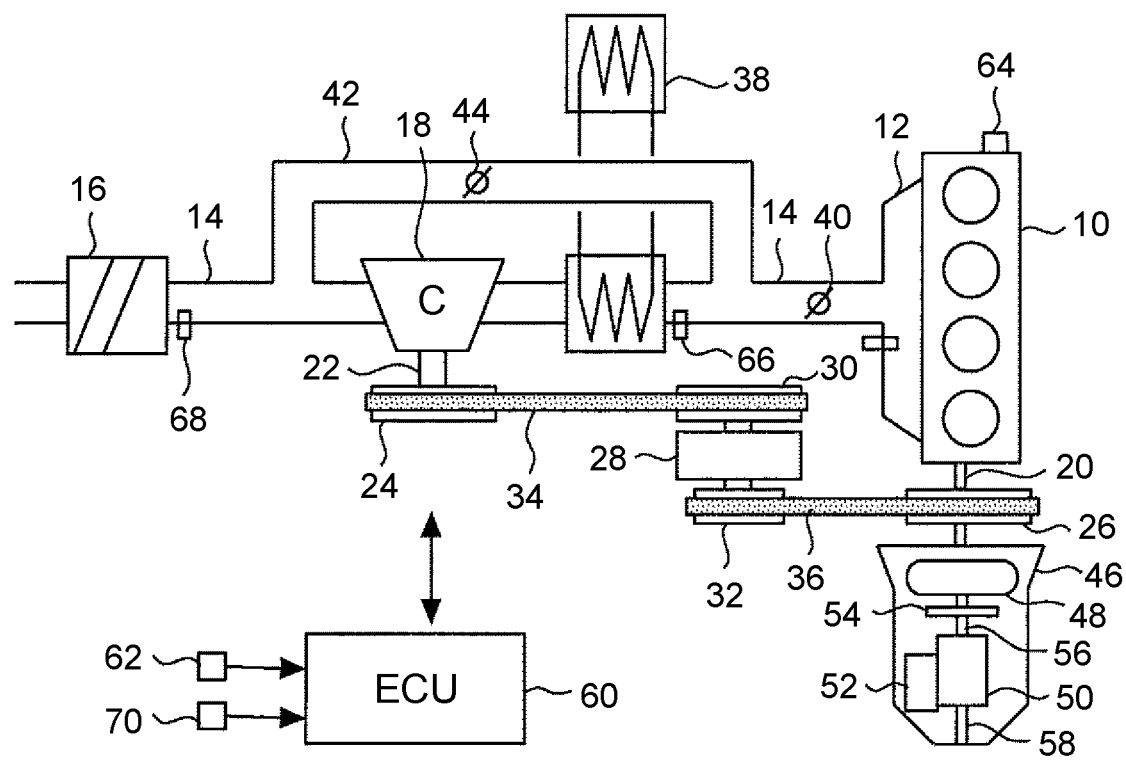
FIG. 1 is an explanatory view illustrating an example of system configuration in a first embodiment of the present disclosure.

First, a first embodiment of the present disclosure will be described with reference to FIGS. 1 to 6.
System Configuration of First Embodiment FIG. 1 is an explanatory view illustrating an example of system configuration in the first embodiment of the present disclosure. The system illustrated in FIG. 1 is mounted on a vehicle. The system includes an internal combustion engine (hereinafter also referred to as "engine") 10 as a power source. The engine 10 is illustrated as an in-series 4-cylinder engine. However, the number of cylinders and the cylinder arrangement of the engine 10 are not limited thereto. Each cylinder of the engine 10 is connected to an intake manifold 12 that functions as a surge tank. The intake manifold 12 is connected to an intake pipe 14.

Attached in the vicinity of an inlet of the intake pipe 14 is an air cleaner 16. Provided downstream of the air cleaner 16 is a mechanical supercharger (hereinafter also referred to as "supercharger") 18. The supercharger 18 is constituted of a centrifugal compressor. The supercharger 18 rotates in conjunction with a crankshaft 20 that is an output shaft of the engine 10, and compresses intake air. The supercharger 18 has a rotary drive shaft 22 that is mounted with a compressor pulley 24. The crankshaft 20 is mounted with a crank pulley 26. The compressor pulley 24 and the crank pulley 26 are connected through a variable speed increase ratio device 28.

The variable speed increase ratio device 28 is a continuously variable or stepped transmission that can change a ratio (hereinafter also referred to as "speed increase ratio Ir") of the speed (hereinafter also referred to as "compressor speed (compressor rotational speed) NC") of the rotary drive shaft 22 to the speed (hereinafter also referred to as "engine speed (engine rotational speed) NE") of the crankshaft 20. As the speed increase ratio Ir is larger with the speed of the crankshaft 20 being constant, the rotary drive shaft 22 rotates at higher speed, and supercharging capacity provided by the supercharger 18 is enhanced more. The variable speed increase ratio device 28 includes pulleys 30, 32. A belt 34 is stretched over the pulley 30 and the compressor pulley 24. A belt 36 is stretched over the pulley 32 and the crank pulley 26.

Provided downstream of the supercharger 18 is an intercooler 38 that cools compressed intake air. Provided downstream of the intercooler 38 is a throttle valve 40. Connected between the intercooler 38 and the throttle valve 40 is a downstream end of a bypass pipe 42. An upstream end of the bypass pipe 42 is connected between the air cleaner 16 and the supercharger 18. The bypass pipe 42 is provided with a bypass valve 44. During driving of the supercharger 18, the bypass valve 44 is basically controlled to be on a closed side.

The crankshaft 20 is connected to a transmission 46. The transmission 46 is a stepped transmission that transmits rotational power of the engine 10 to tires (not illustrated). The transmission 46 is also an automatic transmission. However, the transmission 46 may be a manual transmission. The transmission 46 includes a torque converter 48, a speed change mechanism unit 50, a hydraulic control circuit 52, and an oil pump 54. The torque converter 48 is connected to the crankshaft 20. The speed change mechanism unit 50 changes the speed of rotational power input into the input shaft 56 from the torque converter 48, and outputs the rotational power to the output shaft 58. The hydraulic control circuit 52 controls speed change operation of the speed change mechanism unit 50.

The system illustrated in FIG. 1 includes an ECU 60 as a control device. The ECU 60 includes a CPU, a RAM, a ROM, an input interface, an output interface, and a bi-directional bus. The input interface of the ECU 60 is connected to components such as an accelerator operation amount sensor 62, a crank angle sensor 64, a supercharging pressure sensor 66, an air flowmeter 68, and a vehicle speed sensor 70. The output interface of the ECU 60 is connected to components such as a speed increase ratio control circuit that controls the speed increase ratio Ir, and a hydraulic control circuit 52.

The accelerator operation amount sensor 62 outputs a signal corresponding to a stepping-in amount of an accelerator pedal (hereinafter also referred to as "accelerator opening operation amount"). The crank angle sensor 64 outputs a signal corresponding to a rotation angle of the crankshaft. The supercharging pressure sensor 66 outputs a signal corresponding to the intake pipe internal pressure (hereinafter also referred to as "supercharging pressure") on the upstream side of the throttle valve 40. The air flowmeter 68 outputs a signal corresponding to the flow rate of air taken into the engine 10 (hereinafter also referred to as "intake air amount"). The vehicle speed sensor 70 outputs a signal corresponding to travel speed of the vehicle (hereinafter also referred to as "vehicle speed").

Shift Control of Transmission 46

Figure 2:
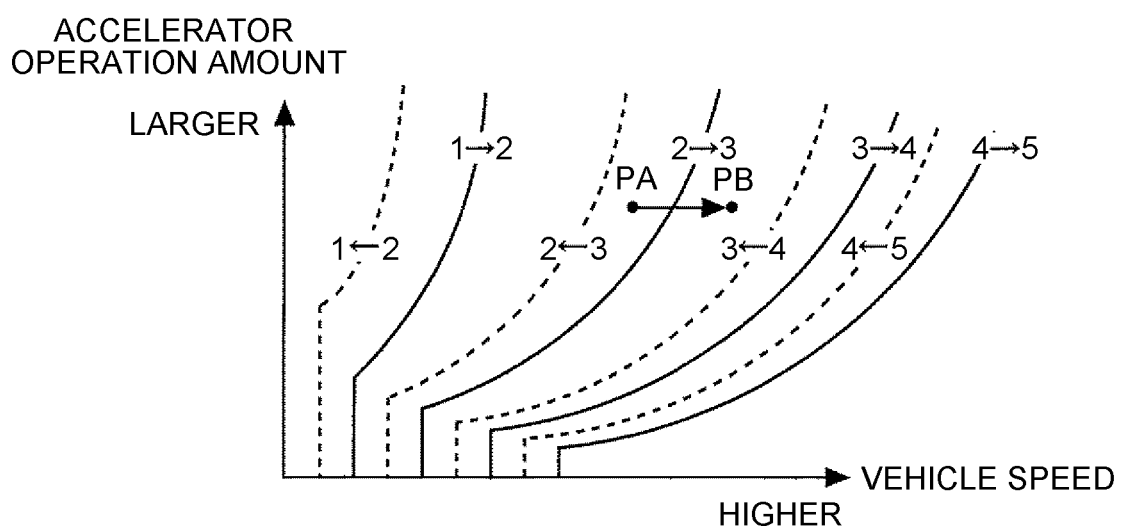
FIG. 2 illustrates one example of a shift map for obtaining an adequate gear stage with vehicle speed and accelerator operation amount as parameters.

FIG. 2 illustrates one example of a shift map for obtaining an adequate gear stage (a gear stage offering optimum fuel efficiency) with the vehicle speed and the accelerator operation amount as parameters. The shift map illustrated in FIG. 2 is divided into a plurality of regions by a plurality of shift lines (gear stage switching lines). In FIG. 2, a solid line represents an upshift line and a dashed line represents a downshift line. The direction of switching between upshift and downshift is illustrated with use of numeric characters and arrows. For example, the shift map illustrated in FIG. 2 is stored in the ROM of the ECU 60.

The ECU 60 calculates the vehicle speed based on an output signal of the vehicle speed sensor 70 (or an output signal of the crank angle sensor 64). The ECU 60 also calculates the accelerator operation amount based on an output signal of the accelerator operation amount sensor 62. The ECU 60 calculates a target gear stage based on the calculated vehicle speed and accelerator operation amount with reference to the shift map of FIG. 2. The ECU 60 compares the calculated target gear stage with a current gear stage to determine whether or not shift operation is necessary. When determining, as a result of determination, that the shift operation is not necessary, the ECU 60 outputs to the hydraulic control circuit 52 a control signal for maintaining the current gear stage.

When determining, as a result of determination, that the shift operation is necessary, the ECU 60 outputs to the hydraulic control circuit 52 a control signal for changing the current gear stage. For example, when an operation point shifts from PA to PB, it crosses an upshift line "2→3". Consequently, the ECU 60 determines that the shift operation is necessary as a result of comparison between the current gear stage (second stage) and a target gear stage (third gear) calculated from the shift map. Accordingly, the ECU 60 outputs to the hydraulic control circuit 52 a control signal for performing upshift (2→3 upshift) from the second gear stage to the third gear stage.

Problem Relating to Shift Control of Transmission 46

Figure 3:
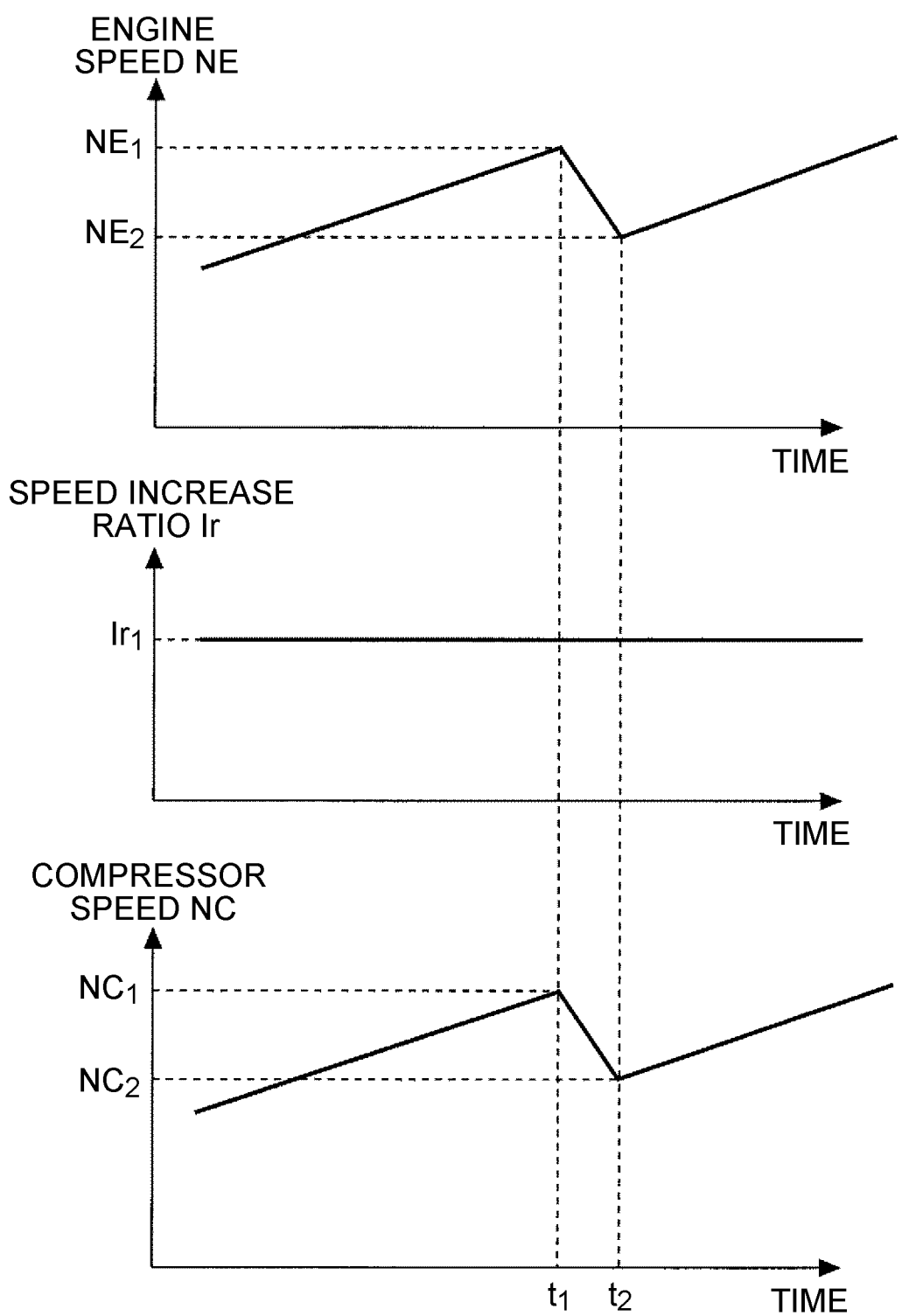
FIG. 3 is an explanatory view illustrating a problem relating to upshift operation of the gear stage.

As described in the foregoing, when the vehicle drive system including the stepped transmission for tires performs upshift operation of the gear stage, the engine speed decreases. FIG. 3 is an explanatory view illustrating a problem relating to upshift operation of the gear stage. When a driver steps on the accelerator pedal to accelerate the vehicle, the accelerator operation amount increases and the engine speed rises. With the rise of the engine speed, the vehicle speed rises. When the operation point crosses an upshift line (see FIG. 2), upshift operation of the gear stage is performed. For example, the upshift operation is started at time $t_1$ of FIG. 3, and ends at time $t_2$.

The upshift operation is basically performed for a short time. That is, an interval between time $t_1$ and time $t_2$ is basically short. Accordingly, the vehicle speed and the speed of tires from time $t_1$ to time $t_2$ are substantially constant. Therefore, the engine speed NE inevitably declines during a period from time $t_1$ to time $t_2$. For example, the engine speed NE declines from $NE_1$ to $NE_2$ (upper row of FIG. 3). In the first embodiment, a stepped automatic transmission is used as the stepped transmission for tires. The engine speeds $NE_1$, $NE_2$ are specified in each gear stage under the constant vehicle speed.

In the system illustrated in FIG. 1, the transmission 46 and the supercharger 18 rotate in conjunction with rotation of the crankshaft 20. Accordingly, when the speed increase ratio Ir during upshift operation is maintained at $Ir_1$ (middle row in FIG. 3), the compressor speed NC declines. For example, the compressor speed NC declines from $NC_1$ to $NC_2$ (lower row in FIG. 3). When the compressor speed NC declines, the flow rate of air discharged from the supercharger 18 (hereinafter also referred to as "discharged air amount") reduces. As a result, the torque generated in the engine reduces. That is, during the upshift operation, the engine speed NE decreases and so dose engine shaft torque. When the engine shaft torque decreases, a difference in vehicle acceleration is generated during upshift operation, which may give discomfort to the driver.

Speed Increase Ratio Control of Variable Speed Increase Ratio Device 28

Figure 4:
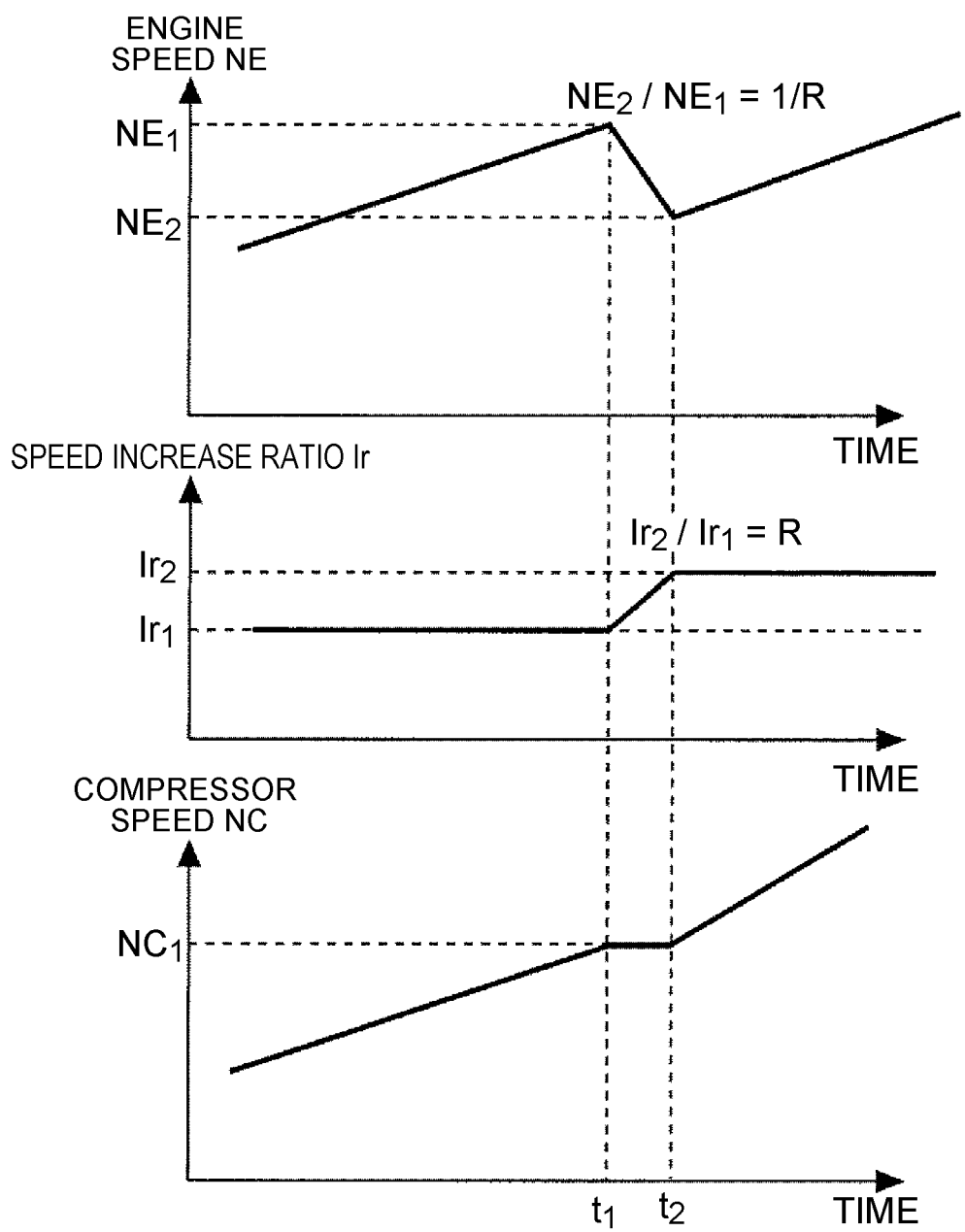
FIG. 4 is an explanatory view illustrating characteristics of speed increase ratio control in the first embodiment of the present disclosure.

Accordingly, control to raise the speed increase ratio Ir during upshift operation is performed in speed increase ratio control of the first embodiment. FIG. 4 is an explanatory view illustrating characteristics of the speed increase ratio control in the first embodiment of the present disclosure. As illustrated in FIG. 4, in the speed increase ratio control of the first embodiment, the speed increase ratio Ir is raised in accordance with decrease in the engine speed NE during a period from time $t_1$ to time $t_2$ when the upshift operation is performed. A speed increase ratio Ir(t) at time t (provided that $t_1 < t < t_2$) is defined by Expression (1) with use of engine speed NE(t) at time t.

$$Ir(t) = Ir_1 \times NE_1 / NE(t) \qquad (1)$$

During the period from time $t_1$ to time $t_2$, the engine speed NE(t) becomes lower than $NE_1$. Accordingly, if the speed increase ratio Ir(t) is controlled based on Expression (1), the compressor speed NC from time $t_1$ to time $t_2$ can be maintained at $NC_1$. If the compressor speed NC is maintained at $NC_1$, the discharge air amount does not reduce during the upshift operation. Accordingly, it is possible to suppress decrease in the engine shaft torque during the upshift operation.

In the first embodiment, the speed increase ratio Ir during upshift operation is controlled with use of Expression (1). However, a right-hand side of Expression (1) may also be multiplied by a coefficient α (provided that α>1). If the right-hand side of Expression (1) is multiplied by the coefficient α, the compressor speed NC from time $t_1$ to time $t_2$ can be made higher than $NC_1$. Accordingly, the discharge air amount does not reduce during upshift operation. Therefore, as in the case of using Expression (1), it is possible to suppress decrease in the engine shaft torque during upshift operation.

The speed increase ratio Ir during upshift operation can also be controlled without use of Expression (1). Specifically, the speed increase ratio Ir may be controlled such that the compressor speed NC rises, immediately after the start of upshift operation, to a specified value higher than the value at the end of the upshift operation (i.e., the compressor speed $NC_2$), and then the compressor speed NC decreases to the value at the end of the upshift operation. Even when the speed increase ratio Ir is controlled in this way, the discharge air amount does not reduce during the upshift operation.

Therefore, as in the case of using Expression (1), it is possible to suppress reduction in the discharge air amount during upshift operation.

In FIG. 4, the speed increase ratio Ir after time $t_2$ is maintained at $Ir_2$ $(=Ir_1 \times NE_1/NE_2)$. However, the speed increase ratio Ir after time $t_2$ may also gradually be decreased from $Ir_2$ to $Ir_1$. If the speed increase ratio Ir after time $t_2$ is gradually decreased from $Ir_2$ to $Ir_1$, excessive increase in the supercharging pressure after time $t_2$ can be suppressed.

Here, by deforming Expression (2) that defines the vehicle acceleration, Expressions (3) to (8) can be derived.

$$\begin{aligned}
\text{Vehicle acceleration} &= \text{propulsive force} \times \text{constant} & (2)\\
&= \text{Tire shaft torque} \times \text{constant} & (3)\\
&= \text{Engine shaft torque} \times NE/Ntire \times \text{constant} & (4)\\
&= \text{Engine shaft output}/NE \times NE/Ntire \times \text{constant} & (5)\\
&= \text{Engine shaft output}/Ntire \times \text{constant} & (6)\\
&= \text{Intake air amount}/Ntire \times \text{constant} & (7)\\
&= \text{Intake pipe internal pressure} \times NE/Ntire \times \text{constant} & (8)
\end{aligned}$$

Note that Expression (2) is deformed on the premise that at least conditions (i) to (vi) described below are established during upshift operation.
(i) The accelerator operation amount (opening degree of the throttle valve) is constant.
(ii) The engine speed NE reduces.
(iii) Tire speed Ntire is constant.
(iv) Power transmission efficiency from the crankshaft to the tires is constant.
(v) Thermal efficiency in the engine is constant.
(vi) An air utilization rate in the engine is constant.

Figure 5:
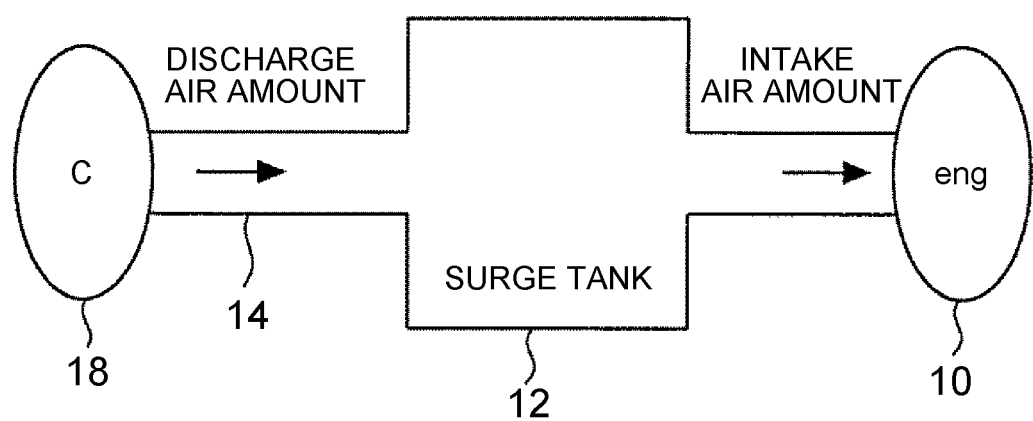
FIG. 5 is a model diagram illustrating an airflow rate on upstream and downstream sides of a surge tank.

Expression (7) indicates that the vehicle acceleration becomes constant when the intake air amount during upshift operation is steady. Expression (8) indicates that the intake air amount during upshift operation becomes steady when the intake pipe internal pressure is increased in proportion to a decreased amount of the engine speed NE. FIG. 5 is a model diagram illustrating the airflow rate on upstream and downstream sides of the surge tank (i.e., intake manifold 12). As indicated in FIG. 5, the pressure of air in the surge tank (i.e., intake pipe internal pressure) is dependent on the air amount obtained by subtracting the intake air amount from the discharge air amount (hereinafter also referred to as "difference in the airflow rate"). That is, the intake pipe internal pressure increases or reduces in accordance with the difference in the airflow rate.

When the engine speed NE decreases with upshift operation, the intake air amount reduces. As stated before, when the speed increase ratio during upshift operation is maintained constant, the compressor speed NC decreases, and thereby the discharge air amount reduces. That is, when the speed increase ratio during upshift operation is maintained constant, both the intake air amount and the discharge air amount reduce.

When the speed increase ratio is raised as in the speed increase ratio control of the first embodiment, the discharge air amount does not reduce during upshift operation. Rather, the discharge air amount during upshift operation can be increased. Accordingly, the difference in the airflow rate during upshift operation can be enlarged. The enlarged difference in the airflow rate increases the intake pipe internal pressure. When the intake pipe internal pressure is increased, air is easily taken into the engine 10. That is, when the intake pipe internal pressure is increased, the intake air amount easily increases. Thus, the speed increase ratio control of the first embodiment can suppress decrease in the engine shaft torque during upshift operation. Therefore, it becomes possible to suppress the difference in the vehicle acceleration during upshift operation.

The speed increase ratio control in the first embodiment is started concurrently with the decrease in the engine speed NE. Accordingly, the rotational energy held by the engine 10 immediately before the start of upshift operation can be used for rotation of the rotary drive shaft 22. Therefore, the compressor speed NC can efficiently be raised by changing the speed increase ratio Ir.

Figure 6:
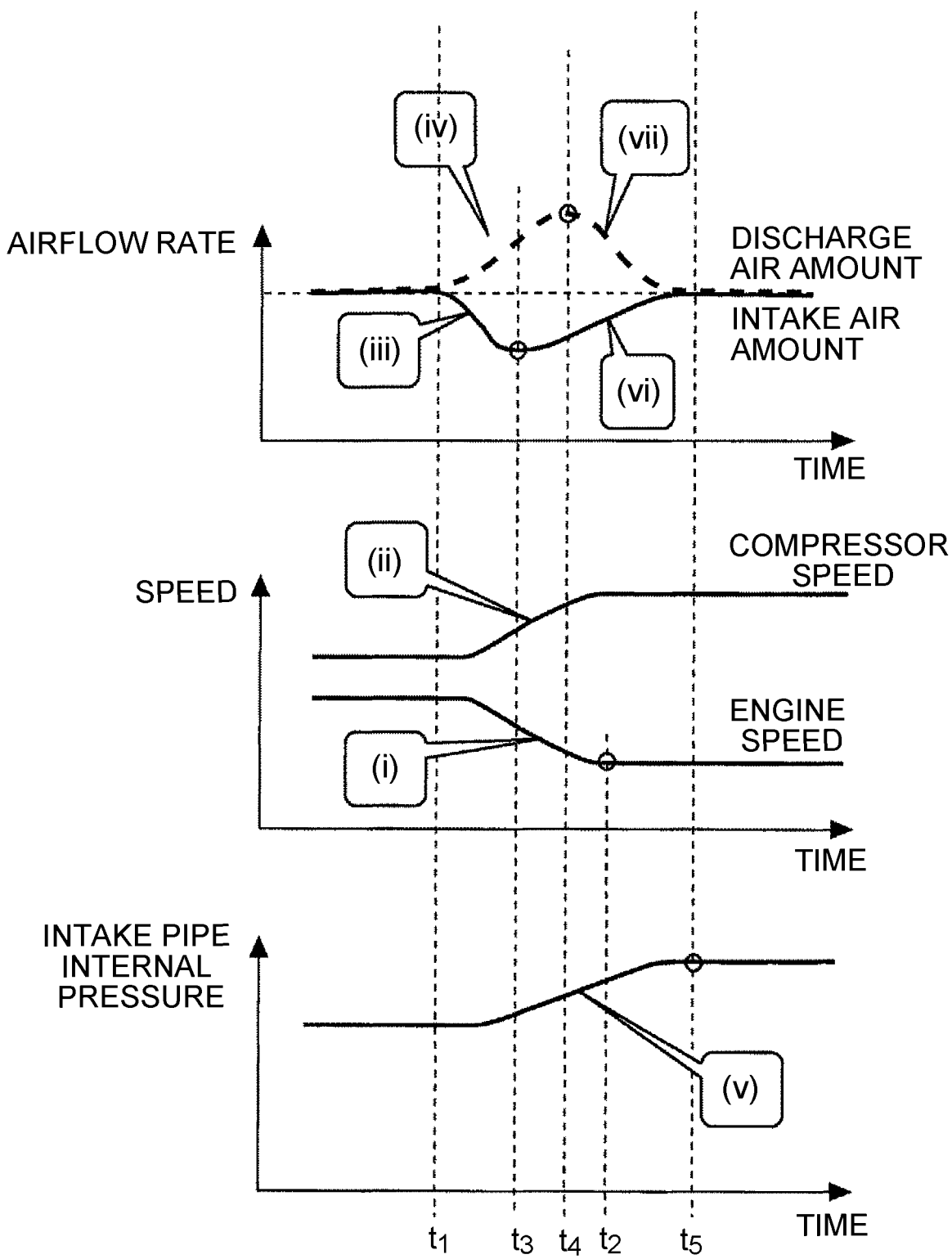
FIG. 6 illustrates transition of airflow rate, speed, and intake pipe internal pressure in the case of performing speed increase ratio control in the first embodiment of the present disclosure.

The effect achieved by the speed increase ratio control of the first embodiment will be described in detail with reference to FIG. 6. FIG. 6 illustrates transition of the airflow rate (representing the discharge air amount or intake air amount, which applies to the description of FIGS. 6 and 8), the speed (representing the engine speed or compressor speed, which applies to the description of FIGS. 6 and 8), and the intake pipe internal pressure when the speed increase ratio control in the first embodiment of the present disclosure is performed. Time $t_1$, $t_2$ illustrated in FIG. 6 correspond to time $t_1$, $t_2$ illustrated in FIG. 4, respectively.

As illustrated in the upper row of FIG. 6, the intake air amount and the discharge air amount are substantially equal before time $t_1$. Accordingly, there is almost no difference in the airflow rate. Therefore, as illustrated in the lower row of FIG. 6, the intake pipe internal pressure is generally constant before time $t_1$.

As illustrated by a line (i) in the middle row of FIG. 6, the engine speed NE decreases during a period from time $t_1$ to time $t_2$. This is because the shift control (upshift operation) of the transmission 46 is performed as described before. As illustrated by a line (ii) in the middle row of FIG. 6, the compressor speed NC rises during the period from time $t_1$ to time $t_2$. This is also because the speed increase ratio control of the first embodiment is performed as described before. In short, the engine speed NE decreases (FIG. 6 (i)), while the compressor speed NC rises (FIG. 6 (ii)) during the period from time $t_1$ to time $t_2$.

When the engine speed NE decreases, the intake air amount reduces. When the compressor speed NC rises, the discharge air amount increases. Therefore, as illustrated by a line (iii) in the upper row of FIG. 6, the intake air amount (solid line) decreases for a while after time $t_1$. As illustrated by a line (iv) in the upper row of FIG. 6, the discharge air amount (dashed line) increases for a while after time $t_1$. In short, the intake air amount decreases (FIG. 6 (iii)), while the discharge air amount increases (FIG. 6 (iv)) for a while after time $t_1$.

When the intake air amount decreases, while the discharge air amount increases, a difference in the airflow rate is enlarged. The reason thereof is as described in FIG. 5. The enlarged difference in the airflow rate increases the intake pipe internal pressure. Therefore, as illustrated by a line (v) in the lower row of FIG. 6, the intake pipe internal pressure rises after time $t_1$.

When the intake pipe internal pressure rises, the intake air amount easily increases as described before. Therefore, as illustrated by a line (vi) in the upper row of FIG. 6, the intake air amount begins to increase after time $t_3$. However, when the intake pipe internal pressure rises, it becomes hard to introduce the air discharged from the supercharger 18 into the intake manifold 12. That is, when the intake pipe internal pressure increases, it becomes hard to increase the discharge air amount. Therefore, as illustrated by a line (vii) in the upper row of FIG. 6, the discharge air amount begins to reduce after time $t_4$. At time $t_5$, the intake air amount and the discharge air amount become substantially equal. As a consequence, the difference in the airflow rate is almost eliminated. Therefore, as illustrated in the lower row of FIG. 6, the intake pipe internal pressure becomes generally constant after time $t_5$.

According to the speed increase ratio control of the first embodiment described in the foregoing, it becomes possible to suppress decrease in the engine shaft torque during upshift operation. Therefore, it becomes possible to suppress difference in the vehicle acceleration during upshift operation.

In the first embodiment, the transmission 46 is one example of "stepped transmission" of the present invention. The supercharger 18 is one example of "centrifugal supercharger" of the present invention. The variable speed increase ratio device 28 is one example of "variable speed ratio device" of the present invention. The ECU 60 is one example of "control device" of the present invention.

Second Embodiment

Now, a second embodiment of the present disclosure will be described with reference to FIGS. 7 to 8. The second embodiment is premised on the example of system configuration illustrated in FIG. 1. The shift control technique of the transmission 46 illustrated in FIG. 1 is also as described in FIG. 2. Therefore, a description of the example of system configuration and a description of the shift control of the transmission 46 will be omitted.

Speed Increase Ratio Control of Variable Speed Increase Ratio Device 28

In the speed increase ratio control in the first embodiment, the speed increase ratio Ir during upshift operation is controlled based on Expression (1). In speed increase ratio control in the second embodiment, the speed increase ratio Ir is controlled such that the compressor speed NC rises to an upper limit NClim immediately after the start of upshift operation, and the upper limit NClim is maintained for a while. Relation between an engine speed NE(t) immediately after the start of upshift and a speed increase ratio Ir(t) is defined by Expression (9) with use of the upper limit NClim.

$$Ir(t)=NC\lim/NE(t) \quad (9)$$

In the speed increase ratio control in the second embodiment, the speed increase ratio Ir is also controlled such that once the supercharging pressure reaches a target supercharging pressure, the compressor speed NC becomes lower than the upper limit NClim. After the supercharging pressure reaches the target supercharging pressure, the speed increase ratio Ir is gradually decreased to a speed increase ratio (i.e., a speed increase ratio $Ir_2$) at the end of the upshift operation.

In the second embodiment, the speed increase ratio Ir is controlled with use of Expression (9) for a while immediately after the start of the upshift operating. However, the speed increase ratio Ir may also be controlled such that the compressor speed NC rises to a specified value higher than the value (i.e., the compressor speed $NC_2$) at the end of the upshift operation, and the specified value is maintained for a while. When the speed increase ratio Ir is controlled in this way, the compressor speed NC rises as in the case of using Expression (9). In the second embodiment, the condition for gradually decreasing the speed increase ratio Ir is expressed as "the supercharging pressure reaches the target supercharging pressure." However, the speed increase ratio Ir may gradually be decreased when any condition equivalent to the above condition is established. For example, the speed increase ratio Ir may gradually be decreased after the lapse of time at which the supercharging pressure is estimated to reach the target supercharging pressure after the start of the upshift operation.

Figure 7:
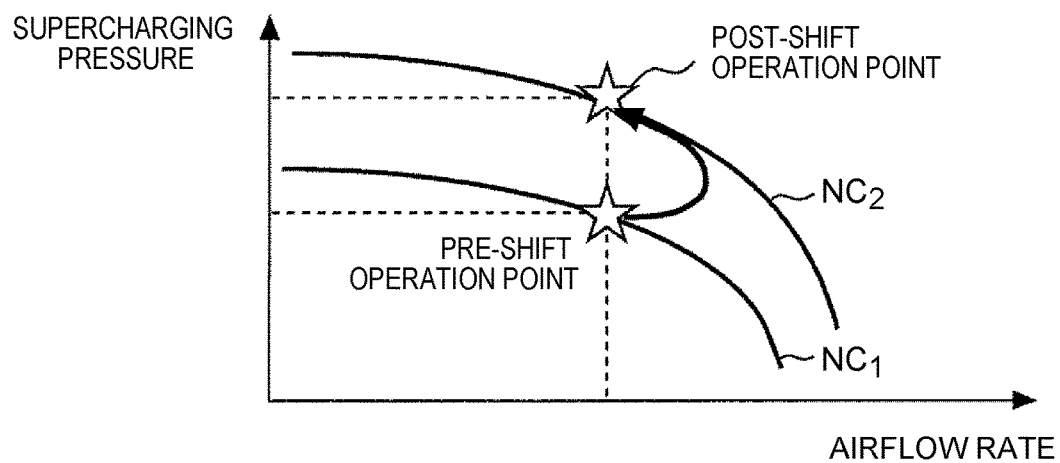
FIG. 7 is an explanatory view illustrating a difference in speed increase ratio control between the first embodiment and a second embodiment of the present disclosure.
Figure 7:
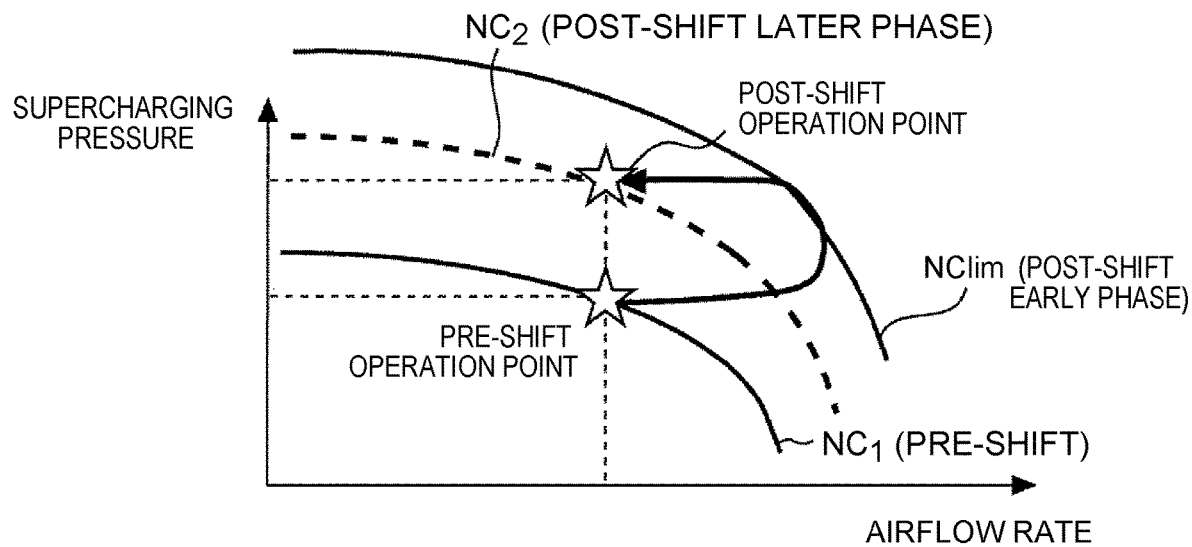

FIG. 7 is an explanatory view illustrating a difference in the speed increase ratio control between the first embodiment and the second embodiment of the present disclosure. The upper row of FIG. 7 corresponds to control in the first embodiment, and the lower row corresponds to control in the second embodiment. The operation lines illustrated by a solid line or a dashed line in FIG. 7 represent relation between the airflow rate and the supercharging pressure (i.e., the intake pipe internal pressure) for each compressor speed NC.

As is clear from comparison between the upper row and the lower row of FIG. 7, operation lines ($NC_1$, $NC_2$) similarly include operation points positioned at the start and at the end of the upshift operation. However, the speed increase ratio control of the first embodiment increases the supercharging pressure, while raising the compressor speed NC. Accordingly, in the speed increase ratio control of the first embodiment, when the supercharging pressure reaches the target supercharging pressure, the operation point shifts to the operation line ($NC_2$). In contrast, the speed increase ratio control of the second embodiment raises the compressor speed NC to the upper limit NClim immediately after the start of upshift operation, and decreases the compressor speed NC after the supercharging pressure reaches the target supercharging pressure. Accordingly, in the speed increase ratio control of the second embodiment, the operation point jumps to another operation line (NClim) in the early phase of the upshift operation. The operation point moves on the operation line (NClim) for a while, and then jumps to the operation line ($NC_2$) in the later phase of the upshift operation.

The effect achieved by the speed increase ratio control of the second embodiment will be described in detail with reference to FIG. 8. FIG. 8 illustrates transition of the airflow rate, the speed, and the intake pipe internal pressure in the case of performing the speed increase ratio control of the second embodiment of the present disclosure. Time $t_1$, $t_2$ illustrated in FIG. 8 correspond to time $t_1$, $t_2$ illustrated in FIG. 4 or FIG. 6, respectively. In the description of FIG. 8, the contents overlapped with those described in FIG. 6 will properly be omitted.

Figure 8:
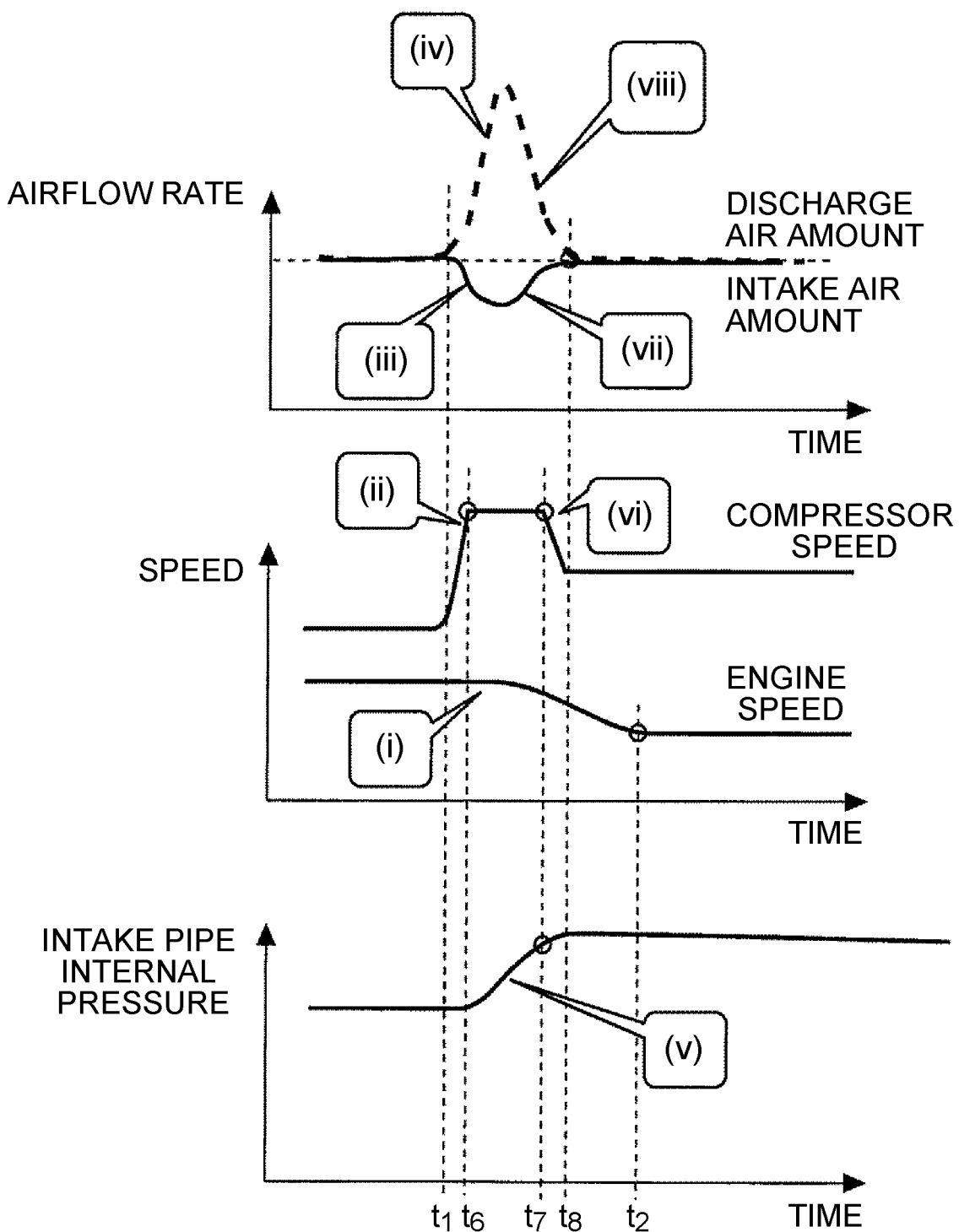
FIG. 8 illustrates transition of airflow rate, speed, and intake pipe internal pressure in the case of performing speed increase ratio control in the second embodiment of the present disclosure.

As illustrated by a line (i) in the middle row of FIG. 8, the engine speed NE decreases during a period from time $t_1$ to time $t_2$. This is because the shift control (upshift operation) of the transmission 46 is performed as described before. As illustrated by a line (ii) in the middle row of FIG. 8, the compressor speed NC rapidly rises after time $t_1$. The compressor speed NC then reaches the upper limit NClim at time $t_6$. This is also because the speed increase ratio control of the second embodiment is performed as described before.

When the engine speed NE decreases, the intake air amount reduces. When the compressor speed NC rapidly rises, the discharge air amount rapidly increases. Therefore, as illustrated by a line (iii) in the upper row of FIG. 8, the intake air amount (solid line) decreases after time $t_1$. As illustrated by a line (iv) in the upper row of FIG. 8, the discharge air amount (dashed line) rapidly increases after time $t_1$.

When the intake air amount decreases, while the discharge air amount rapidly increases, a difference in the airflow rate is enlarged in a short time. The difference in the airflow rate enlarged in a short time increases the intake pipe internal pressure in a short time. Therefore, as illustrated by a line (v) in the lower row of FIG. 8, the intake pipe internal pressure rises after time $t_1$ in a short time. The intake pipe internal pressure then reaches a target supercharging pressure at time $t_7$.

As illustrated by a line (vi) in the middle row of FIG. 8, the compressor speed NC decreases after time $t_7$. This is because the speed increase ratio control of the second embodiment is performed as described before.

When the intake pipe internal pressure rises in a short time, the intake air amount easily increases as described before. Therefore, as illustrated by a line (vii) in the upper row of FIG. 8, the intake air amount begins to increase immediately after time $t_6$. When the intake pipe internal pressure rises in a short time, it becomes hard to introduce the air discharged from the supercharger 18 into the intake manifold 12 in a short time. That is, when the intake pipe internal pressure increases in a short time, it becomes hard to increase the intake air amount in a short time. As illustrated by a line (viii) in the upper row of FIG. 8, the discharge air amount begins to reduce immediately after the intake air amount begins to increase. Then, at time $t_8$, the intake air amount and the discharge air amount become substantially equal. As a consequence, the difference in the airflow rate is almost eliminated. Therefore, as illustrated in the lower row of FIG. 8, the intake pipe internal pressure becomes generally constant after time $t_8$.

According to the speed increase ratio control of the second embodiment described in the foregoing, the intake pipe internal pressure can be raised in a short time. Accordingly, it is possible to shorten the time until the intake air amount and the discharge air amount become substantially equal after the start of the upshift operation. Therefore, it becomes possible to move up the time (i.e., time $t_8$ of FIG. 8), at which the intake air amount and the discharge air amount are made substantially equal, to a time point before the end time (i.e., time $t_2$ of FIG. 8) of the upshift operation. When such time relation can be established, it becomes possible to suppress fluctuation of the engine shaft torque attributed to the difference in the airflow rate after the end of the upshift operation. Therefore, comfortable traveling of the vehicle before and after the upshift operation becomes possible.

When the time relation can be established, it becomes possible to move up the end time (i.e., time $t_2$ of FIG. 8) of the upshift operation. That is, a period of the upshift operation (i.e., a period from time $t_1$ to time $t_2$ of FIG. 8) can be shortened.

What is claimed is:

1. A mechanical supercharging system, comprising:
a stepped transmission that connects a crankshaft of an internal combustion engine with driving wheels, and performs at least upshift operation of a gear stage;
a centrifugal supercharger that rotates in conjunction with the crankshaft to compress intake air of the internal combustion engine, the centrifugal supercharger including a rotary drive shaft connected to the crankshaft;
a variable speed ratio device that changes a speed ratio of the rotary drive shaft to the crankshaft, the variable speed ratio device being provided between the crankshaft and the rotary drive shaft; and
a control device configured to control the speed ratio,
wherein the control device is configured to increase the speed ratio during the upshift operation more than the speed ratio before start of the upshift operation, and
wherein the control device is further configured to increase the speed ratio during the upshift operation in accordance with a decrease rate of speed of the crankshaft during the upshift operation.

2. A mechanical supercharging system, comprising:
a stepped transmission that connects a crankshaft of an internal combustion engine with driving wheels, and performs at least upshift operation of a gear stage;
a centrifugal supercharger that rotates in conjunction with the crankshaft to compress intake air of the internal combustion engine, the centrifugal supercharger including a rotary drive shaft connected to the crankshaft;
a variable speed ratio device that changes a speed ratio of the rotary drive shaft to the crankshaft, the variable speed ratio device being provided between the crankshaft and the rotary drive shaft; and
a control device configured to control the speed ratio,
wherein the control device is configured to increase the speed ratio during the upshift operation more than the speed ratio before start of the upshift operation, and
wherein the control device is further configured to increase the speed ratio during the upshift operation such that speed of the rotary drive shaft rises to a specified value immediately after start of the upshift operation, the specified value being higher than a value at an end of the upshift operation, and the control device is configured to reduce the speed ratio during the upshift operation, once the speed of the rotary drive shaft reaches the specified value, such that the speed of the rotary drive shaft decreases to the value at the end of the upshift operation.

3. The mechanical supercharging system according to claim 2, wherein the specified value is an upper limit of the speed of the rotary drive shaft.

4. A mechanical supercharging system, comprising:
a stepped transmission that connects a crankshaft of an internal combustion engine with driving wheels, and performs at least upshift operation of a gear stage;
a centrifugal supercharger that rotates in conjunction with the crankshaft to compress intake air of the internal combustion engine, the centrifugal supercharger including a rotary drive shaft connected to the crankshaft;
a variable speed ratio device that changes a speed ratio of the rotary drive shaft to the crankshaft, the variable speed ratio device being provided between the crankshaft and the rotary drive shaft; and
a control device configured to control the speed ratio,
wherein the control device is configured to increase the speed ratio during the upshift operation more than the speed ratio before start of the upshift operation, and
wherein the control device is further configured to increase the speed ratio during the upshift operation such that speed of the rotary drive shaft rises to a specified value immediately after start of the upshift operation, the specified value being higher than a value at an end of the upshift operation, and the control device is configured to reduce the speed ratio during the upshift operation, once the speed of the rotary drive shaft reaches the specified value and a supercharging pressure reaches a target supercharging pressure, such that the speed of the rotary drive shaft decreases to the value at the end of the upshift operation.

5. The mechanical supercharging system according to claim 4, wherein the specified value is an upper limit of the speed of the rotary drive shaft.

* * * * *